(12) United States Patent
Smith

(10) Patent No.: US 6,519,944 B2
(45) Date of Patent: Feb. 18, 2003

(54) METHOD OF GENERATING A TRANSIENT PLANT POWER BOOST IN A GAS TURBINE APPARATUS

(75) Inventor: Raub Warfield Smith, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/223,487

(22) Filed: Aug. 20, 2002

(65) Prior Publication Data

US 2002/0194832 A1 Dec. 26, 2002

Related U.S. Application Data

(62) Division of application No. 09/691,585, filed on Oct. 18, 2000, now Pat. No. 6,474,069.

(51) Int. Cl.[7] .................................. F02C 9/16
(52) U.S. Cl. ......................... 60/773; 60/793; 60/727
(58) Field of Search .................. 60/773, 793, 727

(56) References Cited

U.S. PATENT DOCUMENTS

| | | | |
|---|---|---|---|
| 3,757,517 A | 9/1973 | Rigollot | |
| 4,329,842 A | 5/1982 | Hoskinson | |
| 4,441,028 A | * 4/1984 | Lundberg | 290/52 |
| 4,753,068 A | 6/1988 | El-Masri | |
| 5,170,622 A | 12/1992 | Cheng | |
| 5,233,826 A | 8/1993 | Cheng | |
| 5,379,588 A | 1/1995 | Tomlinson | |
| 5,379,589 A | * 1/1995 | Cohn et al. | 60/39.59 |
| 5,450,821 A | 9/1995 | Kalina | |
| 5,544,479 A | 8/1996 | Yan et al. | |
| 5,577,377 A | 11/1996 | Tomlinson | |
| 5,628,179 A | 5/1997 | Tomlinson | |
| 5,778,675 A | 7/1998 | Nakhamkin | |
| 5,867,977 A | 2/1999 | Zachary | |
| 5,934,063 A | 8/1999 | Nakhamkin | |
| 6,038,849 A | 3/2000 | Nakhamkin et al. | |
| 6,216,437 B1 | * 4/2001 | Hepner et al. | 60/773 |
| 6,220,013 B1 | 4/2001 | Smith | |
| 6,244,037 B1 | * 6/2001 | Nakhamkin et al. | 60/773 |
| 6,389,794 B2 | 5/2002 | Ranasinghe | |
| 2001/0004830 A1 | 6/2001 | Wakana et al. | |

FOREIGN PATENT DOCUMENTS

| | | |
|---|---|---|
| DE | 26 42 347 | 4/1977 |
| DE | 197 57 588 | 7/1998 |
| FR | 2 125 680 | 9/1972 |
| JP | 2-89901 | 3/1990 |
| JP | 2-259301 | 10/1990 |
| JP | 3-282102 | 12/1991 |
| JP | 10-131716 | 5/1998 |
| JP | 10-131717 | 5/1998 |
| JP | 10-131718 | 5/1998 |
| JP | 10-131719 | 5/1998 |

OTHER PUBLICATIONS

Patent Abstracts of Japan; vol. 008, No. 016; JP 58 176407; Oct. 15, 1983.

* cited by examiner

*Primary Examiner*—Ehud Gartenberg
(74) *Attorney, Agent, or Firm*—Nixon & Vanderhye PC

(57) ABSTRACT

A system is described for allowing transient power augmentation of a gas turbine or a gas turbine combined cycle power plant. A reservoir of pressurized and/or liquefied gas is installed to store a temporary supply of gas turbine working fluid. This supply of working fluid is available for near instantaneous admission to the gas turbine at the compressor discharge or combustion system to boost output, as may be desirable to assist in supporting electrical grid frequency during a transient disturbance (frequency reduction).

19 Claims, 4 Drawing Sheets

METHOD OF GENERATING A TRANSIENT PLANT POWER BOOST IN A GAS TURBINE APPARATUS

This application is a division of application Ser. No. 09/691,585, filed Oct. 18, 2000 U.S. Pat. No. 6,474,069 the entire content of which is hereby incorporated by reference in this application.

BACKGROUND OF THE INVENTION

The present invention relates to a system for allowing short term power augmentation of a gas turbine or gas turbine combined cycle power plant.

Electrical power grids are comprised of numerous power producers (power plants) and significantly more numerous users (residential and industrial customers). Stabile and reliable control of the grid requires active and continuous balance between electricity supply and demand. This is achieved by a combination of demand forecasting (to assure that a sufficient number of power plants are on line to meet anticipated demand, with margin), and automatic control of each power plant's output as demand changes. Automatic power plant output control is in turn achieved through direct feedback of frequency error (deviation from either 50 or 60 Hz depending on where in the world the power plant is located) to drive a change in plant output.

If electricity supply exceeds demand, the grid frequency will increase above the target value. This positive frequency error will be detected by the power plant control system and cause fuel flow and plant output to reduce to bring the grid frequency back to the target value. When the frequency error is zero, the power plant's output will stabilize. Conversely, if electricity demand exceeds supply into the grid, the grid frequency will dip below the target value. This negative frequency error will again be detected by the power plant control system and cause fuel flow and plant output to increase to bring the grid frequency back to the target value (provided the plant was not already at full load).

Under normal circumstances the frequency of electricity on a well operated grid will be extremely stabile. Most electricity customers are small in relation to the total electricity demand such that load increases are generally gradual and predictable. Power plants, on the other hand, can be quite large such that a trip event can significantly depress grid frequency as the remaining units respond. The potential for unplanned events to trip a power plant offline requires the grid to be operated with some reserve capacity at all times. Another reality of power generation is that power plants are generally most economical to run at full rated capacity. Those units running at full load are not expected to increase load when grid frequency falls, but they are expected to at least maintain their load through small variations from the target frequency, (typically 1%). Beyond this narrow frequency range power is allowed to fall, typically at the same rate as frequency, but not faster. These requirements are not a particular problem for some types of power plant such as hydroelectric or fossil fired steam plants since the grid frequency reduction does not impact the flow of working fluid (water to turbine, or air to the combustor). Such is not the case for gas turbine based power plants where the working fluid (air) is provided by a compressor spinning at a speed directly determined by grid frequency. In fact compressor airflow typically decreases more rapidly than grid frequency such that the natural tendency is for power output to fall significantly as grid frequency decreases. This is further compounded with large frequency dips (>1%) where the gas turbine may require additional airflow reduction, (via guide vane action), to maintain safe compressor operation.

As noted above, gas turbine and gas turbine combined cycle power output capability typically drops in direct proportion to a grid frequency (shaft speed) reduction, whereas the desired output response is inversely proportional to the grid frequency (shaft speed) such that the target grid frequency (shaft speed) tends toward its target value. One contributor to this behavior is the natural reduction in compressor inlet air flow with reduced shaft speed. The control system may additionally limit compressor air flow to maintain adequate margin against compressor surge. Fuel flow is also limited by combustion stability and parts life considerations.

Several means of gas turbine and combined cycle power augmentation have been proposed and implemented to increase the steady state power capability of gas turbine and gas turbine combined cycles as listed below:

1. Evaporative inlet cooler
2. Inlet fogger (possibly with over spray for wet compression)
3. Inlet chilling
4. Supplementary firing of the HRSG
5. Water injection to the gas turbine
6. Steam injection to the gas turbine Each of these alternatives have drawbacks with respect to providing a near instantaneous and predictable transient output increase in the case of an electric grid frequency reduction. Alternatives 1–6 may already be operating when the frequency reduction event occurs, such that no further output increase is possible. The output boost potential of alternatives 1–3 is also constrained by ambient conditions (e.g., high ambient humidity, or low ambient temperature) and so can not be depended upon to meet the total output boost requirement at all ambient conditions. Within a narrow range of the target frequency power output can be maintained by temporarily running the machine above its design firing temperature (constant fuel flow, reduced airflow) according to alternative 4. This solution will, however, rapidly reduce component life if relied upon too heavily for large frequency dips. Also, alternative 4 will provide the slowest response due to the large thermal heat capacity of the HRSG and steam working fluid. Water injection according to alternative 5 has been associated with increased combustion dynamic pressures and combustion system modification. Steam injection according to alternative 6 provides only a weak boost unless combined with supplementary firing of the HRSG, which is slow response.

Traditional control response to a grid frequency reduction is to increase air flow and/or firing temperature during the under frequency transient. Air flow can only be increased if the gas turbine is operating at less than base load when the event occurs, or the compressor capability was intentionally oversized to provide margin during these under frequency events, which is expensive. Over firing is the fastest response method of boosting gas turbine and gas turbine combined cycle power but is limited in amplitude by the strong relationship of firing temperature to gas turbine hot gas path parts life and maintenance costs.

A few power plants have been built to store energy during low load hours, typically overnight, for later use during peak hours. In the case of gas turbine and gas turbine combined cycle plants, this involves extraction of compressor discharge air to a storage vessel, typically an underground cavern, during low load hours, with subsequent retrieval of this stored air to supply the turbine working fluid flow, and hence output, during peak load hours. Application of this arrangement typically requires suitable geologic circumstances (the cavern) and specialized turbo-machinery and controls.

BRIEF SUMMARY OF THE INVENTION

The invention provides a subsystem that enables a gas turbine or gas turbine based combined cycle power plant to maintain power output during large (>1%) and short duration (a few minutes) grid frequency reduction events without the need to drastically overfire the gas turbine above its rated firing temperature. The invention proposes an adaptation of the gas storage concept to the particular needs of a gas turbine or gas turbine combined cycle power plant faced with grid frequency support duties, i.e. intermittent short term power boost.

The invention provides a simple means for temporarily boosting the shaft output of a gas turbine or gas turbine combined cycle. As such, the system provides low cost, fast response, minimal plant cost and layout impact and simple operation. Three exemplary embodiments of the invention are described hereinbelow, each demonstrating a varying balance of cost and performance.

The invention is thus embodied in gas turbine/combined cycle system wherein a working fluid source is operatively coupled to the gas turbine system for selectively adding a working fluid to the gas turbine system downstream of the compressor and upstream of the gas turbine, to support a transient plant power boost via gaseous working fluid injection. The working fluid source is preferably at least one vessel containing pressurized and/or liquefied gas that is coupled via a flow control valve to the gas turbine system.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
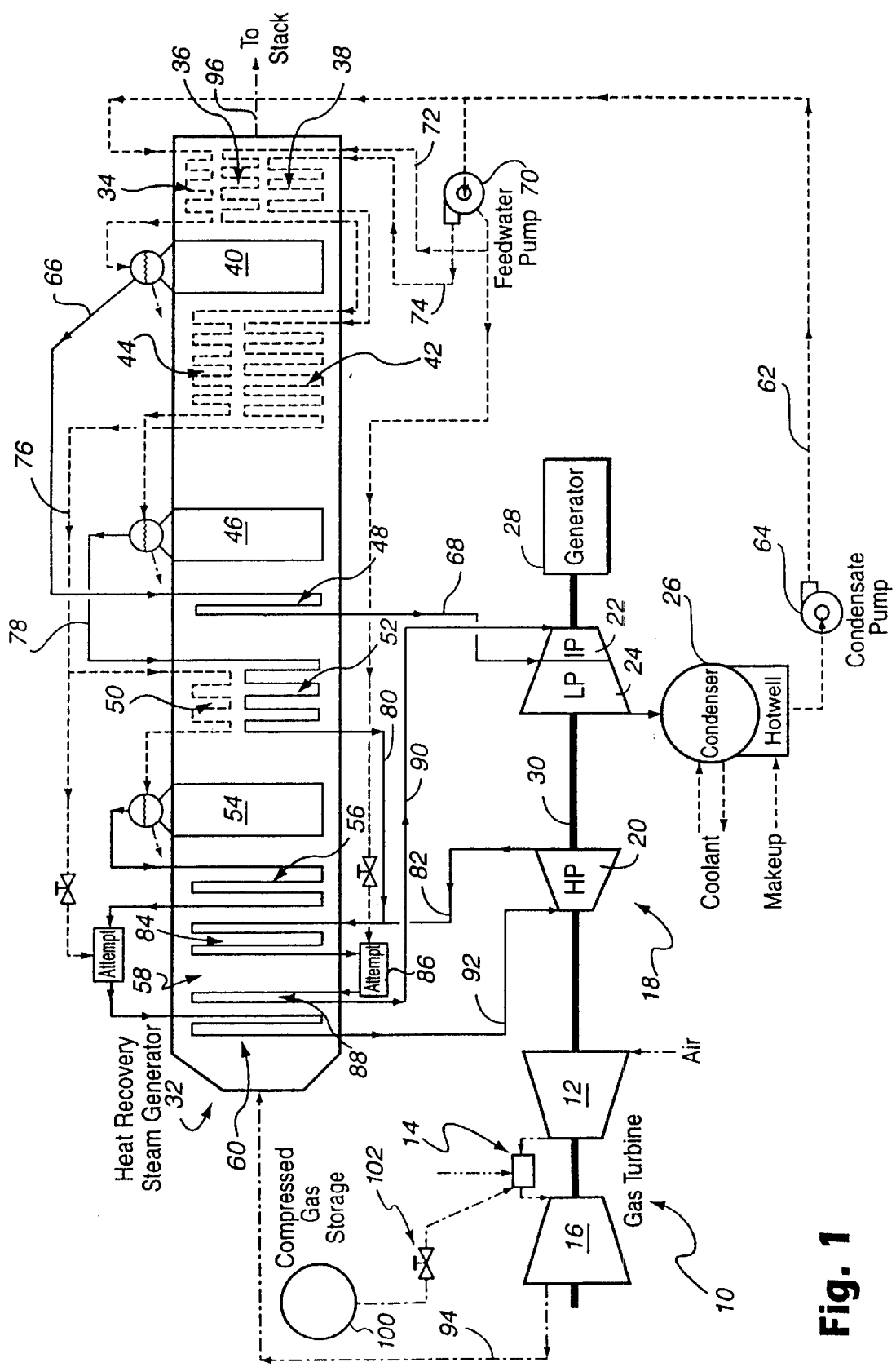
FIG. 1 illustrates the basic structure of a compressed gas storage system for a gas turbine and gas turbine combined cycle power boost application as an embodiment of the invention.

FIG. 1 shows the basic structure of a compressed gas storage system for a gas turbine and gas turbine combined cycle power boost application. More specifically, the embodiment illustrated in FIG. 1 schematically illustrates a combined cycle system having power augmentation with working fluid injection and compressed gas storage. The combined cycle system of the illustrated embodiment is a multi-pressure reheat combined cycle, but the invention is equally applicable to any other bottoming cycle configuration.

In this schematic illustration, steam flow is indicated by a solid line, water and liquid flow is indicated by a dashed line, air and gas flow are indicated by a long and short dash line, and fuel flow is indicated by a dash and two dot line.

This example includes a gas turbine system 10 comprising a compressor 12, a combustion system 14 and a gas turbine expander 16, and a steam turbine system 18 including a high pressure section 20, an intermediate pressure section 22, and one or more low pressure sections 24 with multiple steam admission points at different pressures. The low pressure section 24 exhausts into a condenser 26. The gas turbine system 10 and steam turbine system 18 drive the generator 28 (or other load). The gas turbine system 10, steam turbine system 18, and generator 28 may be arranged in tandem, on a single shaft 30 as shown in FIG. 1, or in a multi-shaft configuration wherein the gas turbine and steam turbine drive separate loads.

The steam turbine system 18 is associated with a multi-pressure HRSG 32 which includes low pressure (LP), intermediate pressure (IP) and high pressure (HP) economizers 34, 36, 38, respectively, an LP evaporator 40, further HP and IP economizers 42, 44, an IP evaporator 46, an LP superheater 48, a final HP economizer 50, an IP superheater 52, an HP evaporator 54, an HP superheater section 56, a reheater 58, and a final HP superheater section 60.

Condensate is fed from condenser 26 to the HRSG 32 via conduit 62 with the aid of condensate pump 64. The condensate subsequently passes through the low pressure (LP) economizer 34 and into the LP evaporator 40. Steam from the LP evaporator 40 is fed via conduit 66 to the LP superheater 48 and then returned to the low pressure section 24 of the steam turbine 18 via conduit 68 and appropriate LP admissions stop/control valve(s) (not shown).

Feedwater with the aid of feedwater pump(s) 70 passes (1) through the IP economizers 36, 44 via conduit 72 and to the IP evaporator 46, and (2) through the HP economizers 38, 42 via conduit 74 and then on to the final HP economizer 50 via conduit 76. At the same time, steam from the IP evaporator 46 passes via conduit 78 to the IP superheater 52 and thereafter flows via conduit 80, is combined with the cold reheat steam 82 from the HP section 20 of the steam turbine 18 and sent through one pass 84 of the reheater 58 and through an attemperator 86. After flowing through a second pass 88 of the reheater 58, the reheated steam is returned to the IP section 22 of the steam turbine 18 via conduit 90 (and appropriate stop/control valves not shown). Meanwhile, condensate in the final HP economizer 50 is passed to the HP evaporator 54. Steam exiting the HP evaporator 54 passes through the HP superheater sections 56 and 60 and is returned to the HP section 20 of the steam turbine 18 by way of conduit 92 and appropriate stop/control valves (if required, not shown).

Heat is provided to the HRSG 32 by the exhaust gases from gas turbine 10 introduced into the HRSG via conduit 94 and which exit the HRSG to a stack (not shown) via conduit 96. More specifically, exhaust from the gas turbine 16 enters the HRSG 32 where it encounters high temperature superheater 60 and 56 and reheater 58 sections 88, 84 disposed upstream of the HP evaporator 54 with respect to the direction of gas flow. As mentioned above, the IP superheater 52 discharge is combined with the cold reheat steam 82 from the HP section 20 of the steam turbine 18 and sent through the reheater 58.

The further discussion of the inventive system will be generally limited to those components provided or added as an embodiment of the inventive system. The reference numbers shown in FIGS. 2, 3 and 4 but not discussed hereinbelow are substantially identical to the corresponding components of the FIG. 1 system and are labeled to provide a frame of reference.

A compressed gas, typically air or nitrogen, is stored in vessel(s) 100 until a requirement for power output boost is detected by the control system. When the event is sensed the control system will open the boost gas flow control valve 102 to supplement the air from compressor 12 with additional working fluid into the gas turbine between the compressor discharge and turbine inlet, with the particular location depending on hardware specifics. The additional mass flow allows more fuel to be burned in the gas turbine combustor 14 such that the turbine inlet temperature remains within its allowable limits. The heated working fluid then expands through the turbine expander 16 to make additional power, as compared to the un-boosted machine, as well as additional exhaust energy available to the bottoming cycle, if present. This system is very simple and would respond quickly, governed by the control system and the boost gas control valve 102 response rate. The duration of the power boost would be limited by the storage capacity of the storage vessel(s) 100.

Figure 2:
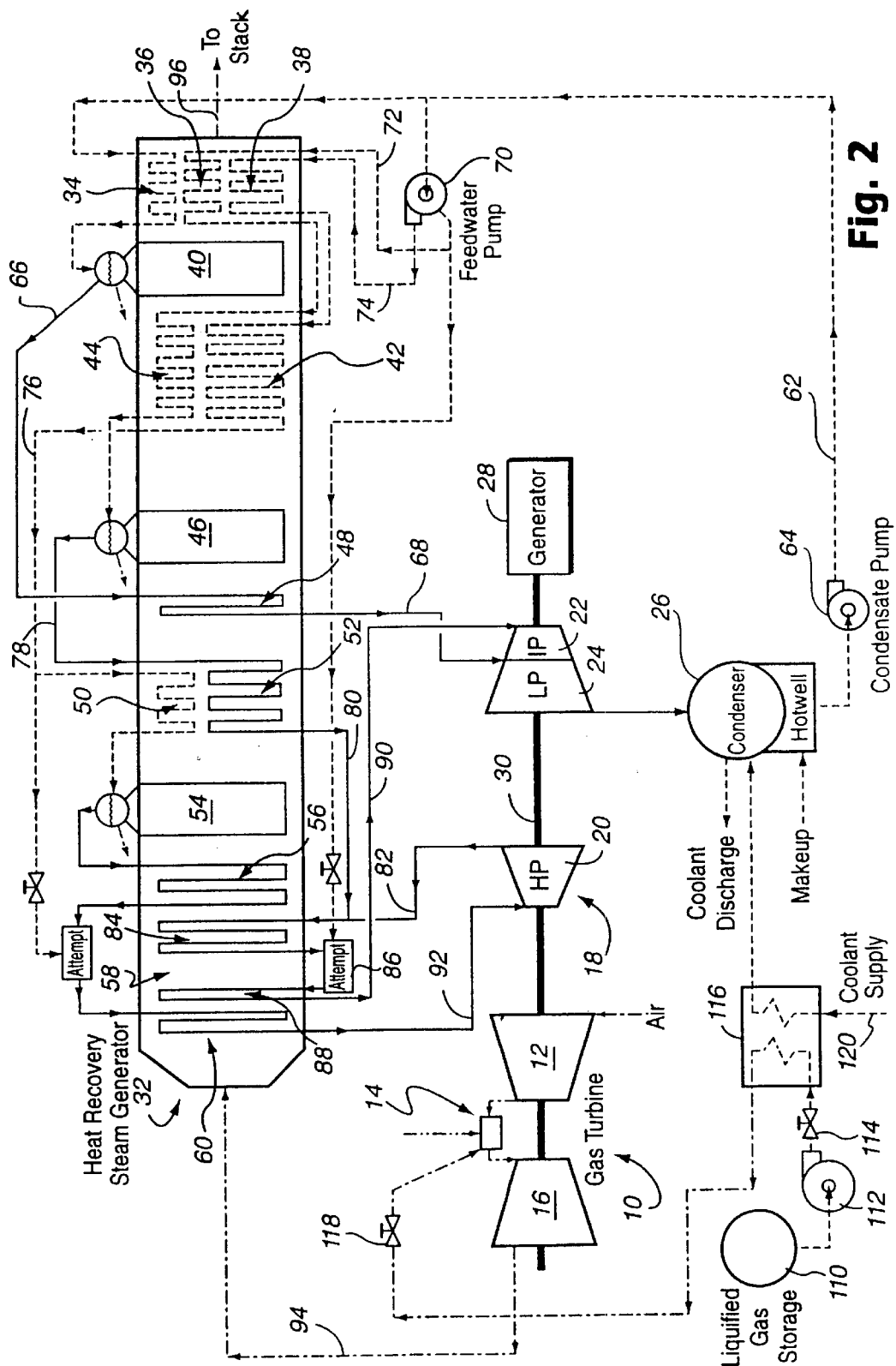
FIG. 2 illustrates an alternate embodiment of the invention that employs liquefied gas storage.

FIG. 2 shows a variation which employs liquefied gas storage, typically nitrogen, to reduce the volume of storage required and/or extend the available boost within the same space constraints. The liquefied gas would be stored in a vessel(s) 110 at approximately atmospheric pressure, and thus would need to be pumped with pump 112 up to gas turbine admission pressure before vaporization in exchanger 116 and admission to the machine. Valve 114 controls the liquid pressure entering exchanger 116 and valve 118 is the boost gas flow control to the gas turbine. The preferred embodiment for gas turbine combined cycle applications uses the condenser circulating water supply 120 to vaporize the cold liquefied gas in exchanger 116. In addition to vaporizing the gas, this cools the cooling water and further boosts plant output by reducing the steam turbine exhaust pressure in the steam condenser 26. If the plant is a simple cycle gas turbine with no steam bottoming cycle, the liquefied gas could most readily be vaporized with air. Once vaporized, the control system will control the boost gas control valve 118 to supplement the air from compressor 12 with additional working fluid into the gas turbine between the compressor discharge and turbine inlet. The additional mass flow allows more fuel to be burned in the gas turbine combustor 14 such that the turbine inlet temperature remains within its allowable limits. The heated working fluid then expands through the turbine expander 16 to make additional power, as compared to the un-boosted machine, as well as additional exhaust energy available to the bottoming cycle, if present. This system requires rapid vaporization of large quantities of liquefied gas and is thus somewhat more complex than a compressed gas storage system of FIG. 1, but could offer a longer duration boost per unit of working fluid storage volume, again ultimately limited by the storage capacity of the storage vessel(s) 110.

Figure 3:
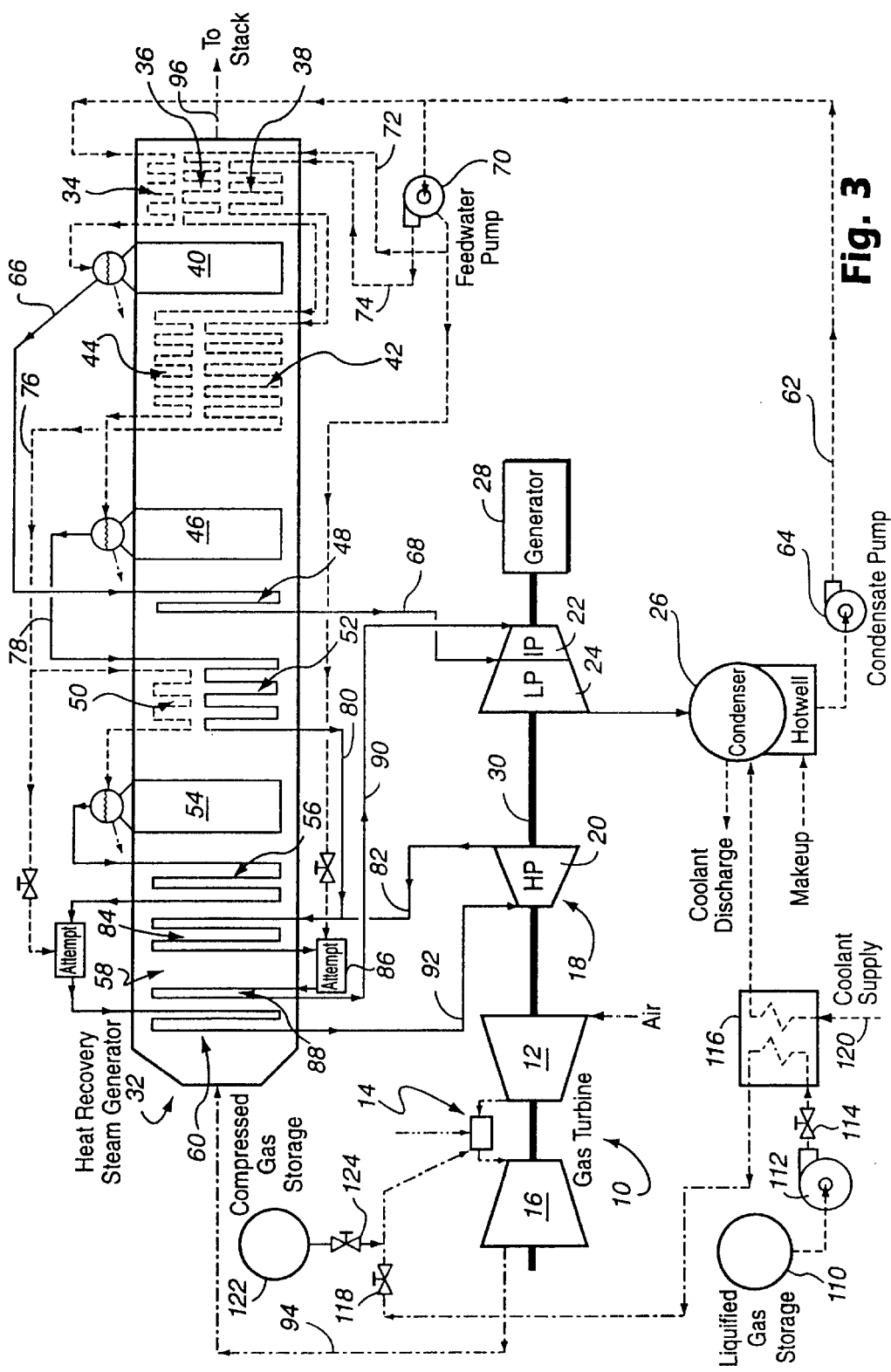
FIG. 3 illustrates a further embodiment of the invention that effectively combines the compressed gas storage system of FIG. 1 with the liquefied gas storage system of FIG. 2.

FIG. 3 combines the compressed gas storage system of FIG. 1 (for fast transient response) with the liquefied gas storage system of FIG. 2 to extend the available boost duration within the system space constraints. This reduces the thermal gradients during startup of the liquefied gas vaporization subsystem by allowing it to be brought on-line more slowly. Initial response would draw the supplemental working fluid from compressed gas storage vessel(s) 122 via boost gas control valve 124 until the vaporized gas from vessel(s) 110 was available to supplant it. Otherwise, this embodiment corresponds to the embodiment of FIG. 2.

Figure 4:
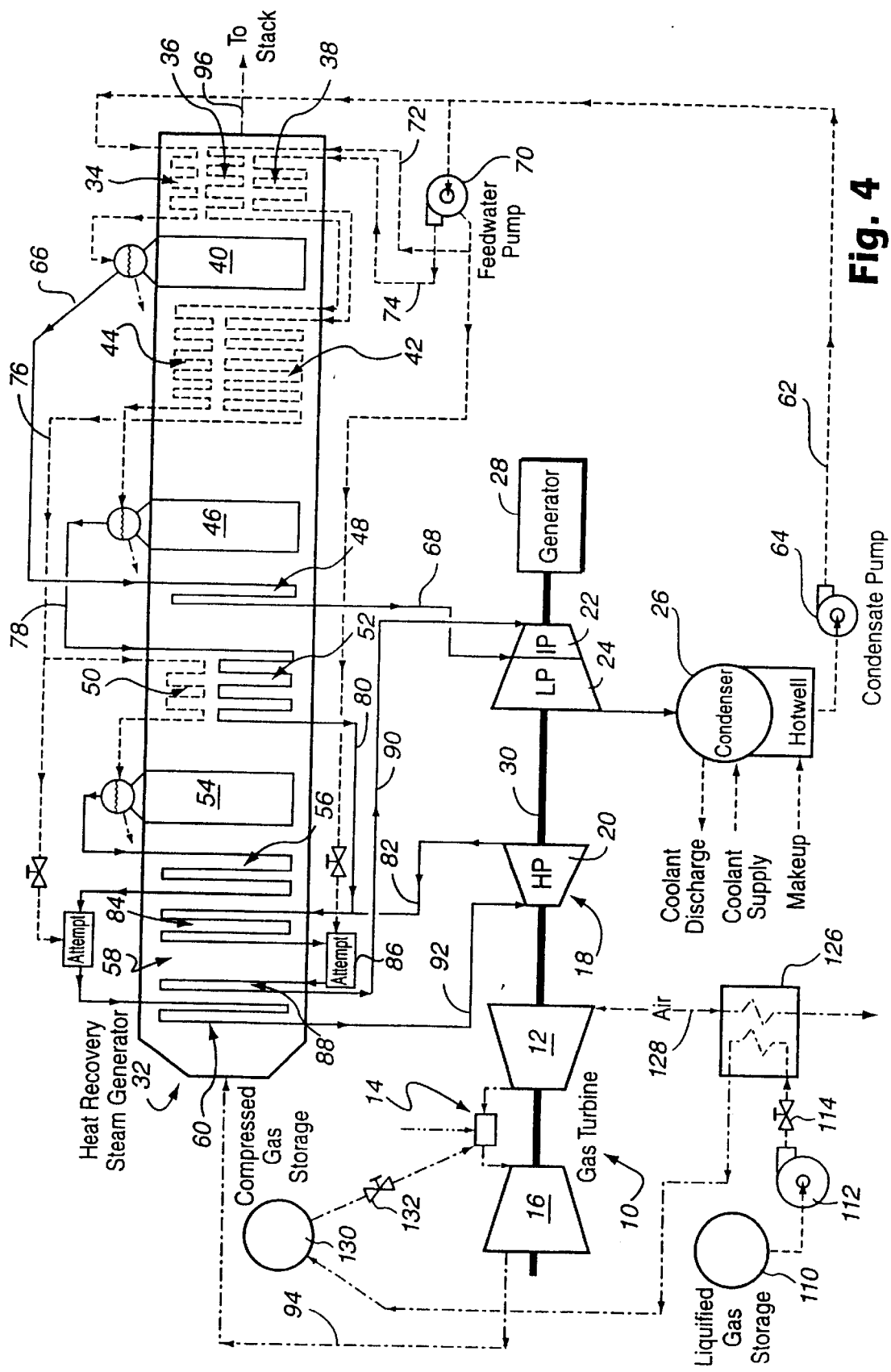
FIG. 4 shows another alternate embodiment of a hybrid compressed gas storage/liquefied gas storage system as an embodiment of the invention.

FIG. 4 shows another embodiment of a hybrid compressed gas storage/liquefied gas storage system exhibiting lower cost but a higher space requirement. In this system, the entire transient need is met with the compressed gas storage vessel 130 (as in the system of FIG. 1), but the liquefied gas allows on site storage 110 of a second charge. When the control system senses the need for working fluid the immediate need is supplied from the compressed gas storage vessel(s) 130 via flow control valve 132. At the same time, the liquid vaporization system is activated to begin replenishment of the compressed gas vessel(s) 130. Liquid is pumped with pump 112 via pressure control valve 114 from the liquid storage tank or vessel(s) 110 to a high pressure suitable for admission to the gas vessel(s) 130, and vaporized at exchanger 126 via heat exchange to air 128, as shown in FIG. 4, or water 120 as in FIG. 3. The liquid flow rate in this system is approximately one to two orders of magnitude lower in relation to the compressed gas flow rate during the transient event, such that replenishment of the compressed gas vessel(s) takes a few hours.

Although four embodiments of the present invention are presented, it is to be understood that numerous other variations may be developed within the constraints of a particular installation which nevertheless rely upon working fluid storage to support a transient plant power boost via gaseous working fluid injection to the gas turbine downstream of the compressor and upstream of the turbine. These systems are distinct from prior art compressed air storage systems in that the storage is either liquid or highly compressed gas to minimize space requirements.

The concept described hereinabove has been studied as an aid to address stringent grid regulations governing power plant response during a frequency reduction event. Nitrogen injection to the combustor was found to meet the entire power augmentation needs of the plant at 95% speed without causing the compressor to exceed its operating limit for surge. The severe under frequency events addressed by this invention are generally transient in nature. Indefinitely sustained plant output at reduced frequency operation may require a combination of systems (such as the one proposed herein with supplementary firing and steam injection). This invention is applicable to all gas turbine and gas turbine combined cycle power plant configurations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for generating a transient plant power boost in a gas turbine apparatus that comprises a gas turbine system including a compressor, a combustion system, and a gas turbine, the method comprising:
   providing a working fluid source, said working fluid source comprising at least one of a compressed gas storage vessel and a liquefied gas storage vessel, each said vessel containing and storing a first gas;
   operatively coupling said vessel via a working fluid flow control valve to a fluid flow path extending between said compressor and said gas turbine; and
   causing said transient plant boost by selectively adding, during said transient, said first gas in gaseous form to fluid flowing through said fluid flow path at a point downstream of said compressor and upstream of said gas turbine.

2. A method as in claim 1, wherein said working fluid source comprises a liquefied gas storage vessel and further comprising vaporizing the liquefied gas intermediate said liquefied gas storage vessel and said gas turbine system.

3. A method as in claim 2, wherein said step of vaporizing comprises passing said liquefied gas through a heat exchanger.

4. A method as in claim 3, wherein the liquefied gas is vaporized by heat exchange with air.

5. A method as in claim 3, wherein said liquefied gas is vaporized by heat exchange with water.

6. A method as in claim 2, further comprising a vessel for storing compressed gas downstream of said liquefied gas storage vessel and upstream of said gas turbine system, and further comprising storing compressed gas in said compressed gas storage vessel in advance of said adding step.

7. A method as in claim 2, further comprising the step of pumping said liquefied gas for increasing a pressure of said liquefied gas.

8. A method as in claim 1, wherein said first gas contains nitrogen.

9. A method for generating a transient plant power boost in a gas turbine combined cycle system comprising:

providing a gas turbine system including a compressor, a combustion system, and a gas turbine; a stream turbine system; a heat recovery steam generator for receiving exhaust gas from the gas turbine for generating steam for the steam turbine;

providing a working fluid source comprising at least one of a compressed gas storage vessel and a liquefied gas storage vessel, each said vessel containing and storing a first gas;

operatively coupling said vessel via a working fluid flow control valve to a fluid flow path extending between said compressor and said gas turbine; and causing said transient plant boost by selectively adding, during said transient, said first gas in gaseous form to fluid flowing through said fluid flow path at a point downstream of said compressor and upstream of said gas turbine.

10. A method as in claim 9, wherein said working fluid source comprises a liquefied gas storage vessel and further comprising vaporizing the liquefied gas intermediate said liquefied gas storage vessel and said gas turbine system.

11. A method as in claim 10, wherein said step of vaporizing comprises passing said liquefied gas through a heat exchanger.

12. A method as in claim 11, wherein the liquefied gas is vaporized by heat exchange with air.

13. A method as in claim 11, wherein said liquefied gas is vaporized by heat exchange with water.

14. A method as in claim 10, further comprising a vessel for storing compressed gas downstream of said liquefied gas storage vessel and upstream of said gas turbine system and further comprising storing compressed gas in said compressed gas storage vessel in advance of said adding step.

15. A method as in claim 10, further comprising the step of pumping said liquefied gas for increasing a pressure of said liquefied gas.

16. A method as in claim 9, wherein said first gas contains nitrogen.

17. A method as in claim 11, further comprising condensing exhaust steam from the steam turbine to water and wherein said heat recovery steam generator receives water from said condenser and converts said water into steam for return to the steam turbine and further comprising supplying coolant to said condenser, said coolant supply flowing through said heat exchanger whereby said coolant supply is cooled and said liquefied gas is vaporized.

18. A method as in claim 9, further comprising a step of increasing a pressure of said liquefied gas.

19. A method as in claim 18, wherein the pressure of said liquefied gas is increased by pumping.

* * * * *